(12) United States Patent
Shultz et al.

(10) Patent No.: US 9,046,175 B2
(45) Date of Patent: Jun. 2, 2015

(54) ACCELERATION BASED MODE SWITCH

(71) Applicant: Allison Transmission Inc., Indianapolis, IN (US)

(72) Inventors: Jeffrey E. Shultz, Zionsville, IN (US); Jared S. Shattuck, Indianapolis, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 185 days.

(21) Appl. No.: 13/653,517

(22) Filed: Oct. 17, 2012

(65) Prior Publication Data

US 2014/0107900 A1 Apr. 17, 2014

Related U.S. Application Data

(62) Division of application No. 13/543,945, filed on Jul. 9, 2012, now Pat. No. 8,712,654.

(51) Int. Cl.
*G06F 17/00* (2006.01)
*F16H 61/68* (2006.01)
*F16H 61/02* (2006.01)

(52) U.S. Cl.
CPC ............ *F16H 61/68* (2013.01); *F16H 61/0204* (2013.01); *G06F 17/00* (2013.01)

(58) Field of Classification Search
CPC ...... G06F 17/00; F16H 61/68; F16H 61/0204
See application file for complete search history.

(56) References Cited

U.S. PATENT DOCUMENTS

| | | |
|---|---|---|
| 4,947,330 A | 8/1990 | Hiramatsu |
| 5,211,080 A | 5/1993 | Leising et al. |
| 5,304,981 A | 4/1994 | Leising et al. |
| 5,679,092 A | 10/1997 | Otsubo et al. |
| 5,685,799 A | 11/1997 | Vukovich et al. |
| 5,738,605 A | 4/1998 | Fliearman et al. |
| 5,913,916 A | 6/1999 | Bai et al. |
| 6,067,495 A | 5/2000 | Fliearman et al. |
| 6,074,326 A | 6/2000 | Sakakibara et al. |
| 6,090,012 A | 7/2000 | Hollingsworth et al. |
| 6,199,003 B1 | 3/2001 | Hollingsworth et al. |
| 6,220,987 B1 | 4/2001 | Robichaux et al. |
| 6,231,477 B1 | 5/2001 | Hollingsworth et al. |
| 7,421,325 B2 | 9/2008 | Geist et al. |
| 7,682,275 B2 | 3/2010 | Yoneyama |
| 8,473,139 B1 * | 6/2013 | Futamura ................ 701/22 |
| 8,694,218 B2 * | 4/2014 | Shultz et al. ............. 701/56 |
| 2003/0000751 A1 | 1/2003 | Denton et al. |
| 2007/0281817 A1 | 12/2007 | Sato |
| 2007/0298932 A1 * | 12/2007 | Yoneyama .............. 477/120 |
| 2008/0027613 A1 * | 1/2008 | Bai et al. ................ 701/55 |
| 2008/0293541 A1 | 11/2008 | Kanafani et al. |

OTHER PUBLICATIONS

USPTO Office Communication Concerning U.S. Appl. No. 13/543,945, mail date Dec. 28, 2012, pp. 1-9.

* cited by examiner

*Primary Examiner* — John Q Nguyen
*Assistant Examiner* — Michael Kerrigan
(74) *Attorney, Agent, or Firm* — Taft Stettinius & Hollister, LLP; Stephen F. Rost

(57) ABSTRACT

The present invention provides a method of selecting and implementing a shift schedule for a transmission in a vehicle that includes an output speed sensor and a controller. The method includes measuring output speed with the output speed sensor and comparing the measured output speed to an output speed threshold. The controller receives throttle percentage and compares the throttle percentage to a throttle threshold. The method also includes calculating output acceleration and transmission gear ratio with the controller. The shift schedule is selected based on the measured output speed, calculated output acceleration, calculated transmission gear ratio, and throttle percentage.

19 Claims, 6 Drawing Sheets

ACCELERATION BASED MODE SWITCH

RELATED APPLICATIONS

This application is a divisional of U.S. patent application Ser. No. 13/543,945 filed Jul. 9, 2012, which is a divisional of U.S. patent application Ser. No. 12/409,989, filed Mar. 24, 2009 entitled "Acceleration Based Mode Switch," the disclosures of which are hereby incorporated by reference in their entirety.

BACKGROUND

The present invention relates to a transmission, and in particular, to a method of selecting a shift schedule for a transmission in a vehicle.

Conventional vehicle automatic transmissions include software or a control scheme for determining when the automatic transmission shifts from one gear ratio to another gear ratio. This control scheme is commonly referred to as a "shift schedule" and is based on multiple factors, e.g., engine torque, vehicle speed and accelerator pedal position (i.e., throttle percentage). Any given shift schedule for a vehicle balances fuel economy against performance, and so a shift schedule may be categorized as an "economy shift schedule" or a "performance shift schedule" based on the balance that characterizes the shift schedule. For example, in an economy-biased shift schedule, a transmission operates in an economy shift schedule more often than it operates in a performance shift schedule.

Also, it is desirable to be able to change shift schedules during vehicle operation since there are times when better fuel economy is preferred over high-performance and vice-versa. For example, when the vehicle is heavily loaded or is ascending a steep grade, the transmission may detect such a condition and select a performance-based shift schedule. Alternatively, when the vehicle is able to quickly accelerate, e.g., when the vehicle is unloaded or descending a steep grade, the transmission may detect this condition and select an economy-based shift schedule.

In a conventional vehicle having an engine and automatic transmission, an engine control module (ECM) controls the engine and a transmission control module (TCM) controls the transmission. A wiring harness is provided that electrically connects the ECM to the TCM so that information related to the engine can be communicated to the TCM. Transmission software is downloaded to the TCM and includes multiple shift schedules that control when the transmission shifts from one gear ratio to another gear ratio. During vehicle operation, the TCM detects a driving condition or a change in a driving condition and selects a shift schedule accordingly.

For the transmission to detect the driving condition or the change in a driving condition, the TCM receives engine data from the ECM and possibly other information about the vehicle from other sources. As such, the transmission must be compatible with the engine and other outside sources to receive this information. For a transmission to operate effectively with the engine, transmission manufacturers must work closely with engine manufacturers to ensure that the TCM timely receives engine data from the ECM. As a result, transmissions can only be mounted behind engines from which the TCM is able to receive engine data.

If a transmission were mounted behind an engine with which it is not compatible, the ECM might not be able to communicate engine data (e.g., engine torque) to the TCM and the TCM might therefore be unable to select the appropriate shift schedule. Alternatively, even if the ECM were able to communicate engine data to the TCM, the ECM still might not be able to communicate the correct data or might provide the data to the TCM too slowly. As a result, as driving conditions change, the TCM would be unable to select a different shift schedule based on the changing driving condition because it would be waiting to receive engine data from the ECM. These problems undesirably limit the number of vehicles in which a given transmission can be installed and require costly and time-consuming coordination efforts between engine and transmission design teams.

What is needed is an improved method of selecting between economy and performance based shift schedules which addresses the compatibility and data transmission problems noted above.

SUMMARY OF THE INVENTION

The present invention provides a method of selecting between economy and performance based shift schedules based solely on transmission data which enhances the compatibility between transmissions and engines and increases the number of vehicles in which a given transmission can be incorporated. The method relies on vehicle acceleration, input and output speed, throttle percentage, and transmission gear ratio rather than non-transmission data.

In particular, a method of selecting and implementing a shift schedule for a transmission in a vehicle is provided in which the transmission has an output speed sensor and a controller. The method includes measuring output speed by the output speed sensor and comparing the measured output speed to an output speed threshold. Throttle percentage is received by the controller and compared to a throttle threshold. The method further includes calculating output acceleration and transmission range. A shift schedule is selected based on the measured output speed, calculated output acceleration, calculated transmission range, and throttle percentage.

In another embodiment, a method of selecting and implementing an economy-based or performance-based shift schedule for a transmission is provided in which the transmission includes a speed sensor and a controller. The method includes using the speed sensor to measure output speed and compare the output speed to an output speed threshold. Throttle is received by the controller and compared to a throttle threshold. The method further includes calculating output acceleration and transmission range and selecting an economy-based or performance-based shift schedule.

In a further embodiment, a method of enabling acceleration-based software based on transmission data for a transmission in a vehicle is provided. The transmission includes an input speed sensor, an output speed sensor, and a controller. The output speed sensor is used to determine if the vehicle is moving and the input speed sensor is used to determine if the vehicle is operating below a predefined engine speed. The method also includes using the controller to determine if an engine in the vehicle is generating power and determining whether to enable an acceleration-based software. The method can further include selecting a shift schedule when the acceleration-based software is enabled.

An advantage of the inventive method is that it utilizes transmission data to determine when an economy shift schedule or performance shift schedule is appropriate. This method enhances the flexibility of vehicle setup because it eliminates the need for the TCM to receive data or other information from the engine or other outside sources. As such, transmission manufacturers can combine their transmissions with a larger variety of engines without the need to coordinate the communication of data between the engine and transmission with engine manufacturers. The acceleration-based software can thus reduce costs of a transmission.

Another advantage of the inventive method is that it allows flexibility in biasing the transmission toward economy or performance. For example, before the acceleration-based software is downloaded to the TCM, the software can be customized such that the transmission operates primarily in the economy shift schedule (e.g., TCM selects the economy shift schedule 75% of the time). Also, because the transmission does not rely on receiving data or other information from sources outside the transmission (e.g., the engine), a further advantage is that the transmission and acceleration-based software can be incorporated into a larger segment of the vehicle market (viz., those vehicles that otherwise possess incompatible engines).

BRIEF DESCRIPTION OF THE DRAWINGS

The above-mentioned aspects of the present invention and the manner of obtaining them will become more apparent and the invention itself will be better understood by reference to the following description of the embodiments of the invention, taken in conjunction with the accompanying drawings, wherein.

Corresponding reference numerals are used to indicate corresponding parts throughout the several views.

DETAILED DESCRIPTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

Figure 1:
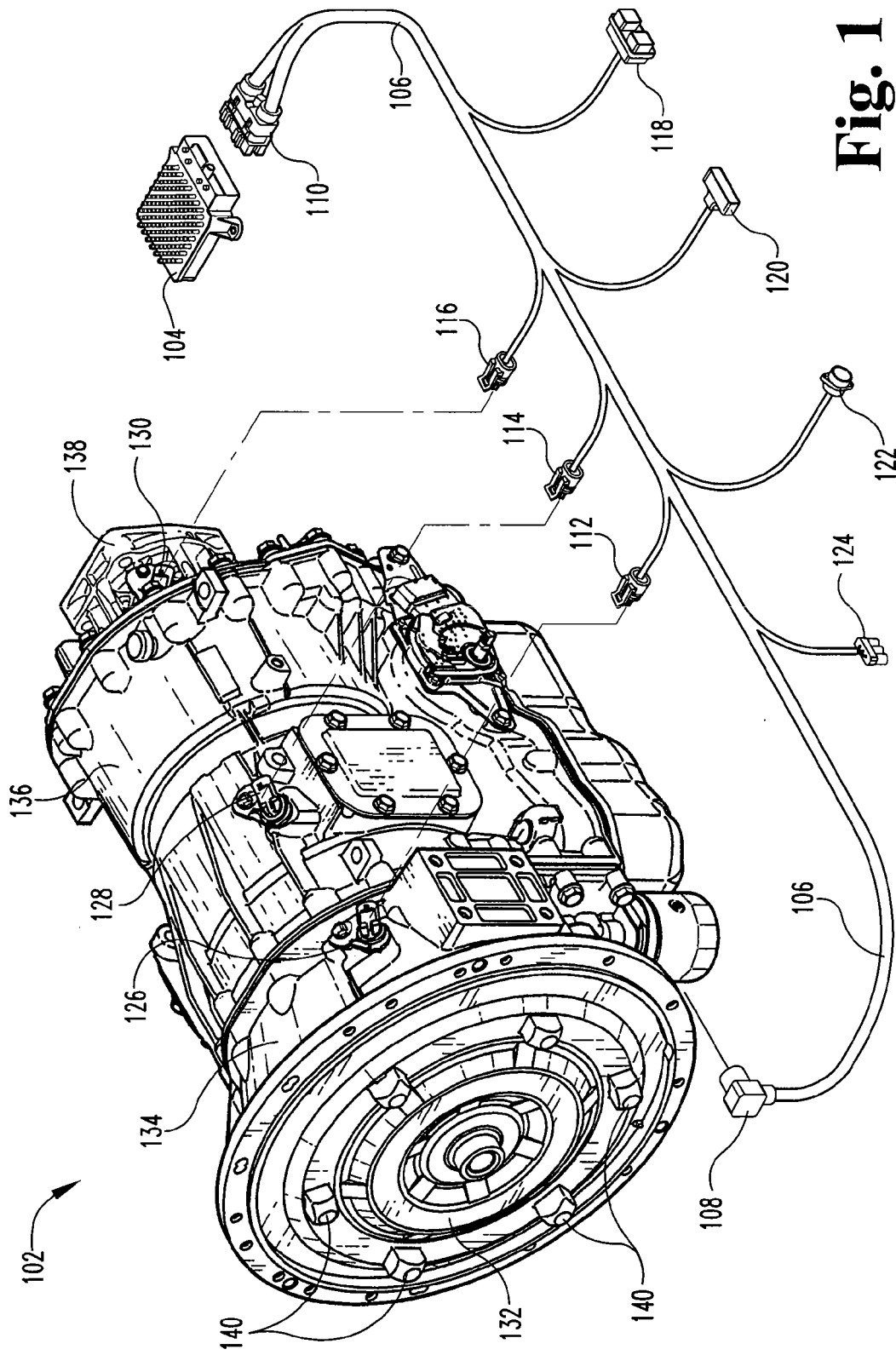
FIG. 1 is a perspective view of one embodiment of a transmission coupled to a controller via a wiring harness.

The present invention relates to transmission software which controls the operation of a transmission in a vehicle. With reference to FIG. 1, an exemplary embodiment of a transmission setup is provided. A transmission 102 is shown in FIG. 1 with a controller 104, i.e., transmission control module ("TCM"). Software is downloaded to the TCM 104 and a wiring harness 106 couples the TCM 104 to the transmission 102. A conventional wiring harness 106 includes an outer plastic body that surrounds wires that extend from a TCM connector 110 at one end of the wiring harness 106 to a transmission connector 108 disposed at the opposite end of the wiring harness 106.

The wiring harness 106 can also include other connectors such as speed sensor connectors. In FIG. 1, for example, an engine or input speed sensor connector 112 couples to an engine or input speed sensor 126 of the transmission 102. Likewise, a turbine speed sensor connector 114 couples the wiring harness 106 to a turbine speed sensor 128 of the transmission 102. Also, an output speed sensor connector 116 of the wiring harness 106 couples to an output speed sensor 130 of the transmission 102. Other possible connectors of the wiring harness 106 include a throttle input source connector 120, a throttle position sensor (TPS) connector 124, a vehicle connector 118 (e.g., Vehicle Interface Module ("VIM") connector), and an alternative transmission harness mating connector 122.

As noted, the transmission 102 includes the engine or input speed sensor 126, turbine speed sensor 128, and output speed sensor 130. The transmission 102 mounts to an engine (not shown) by coupling a converter housing 134 of the transmission 102 to a bell housing (not shown) of the engine (not shown). A torque converter 132 of the transmission 102 includes a plurality of lugs 140 that couple to a flex plate (not shown) via flex plate bolts (not shown). During operation, the engine rotates the torque converter 132 and the engine or input speed sensor 126 detects the rotational speed of the torque converter 132. The torque converter 132 can include ribs or protrusions (not shown) that protrude from the surface of the torque converter 132 and which the engine or input speed sensor 126 measures during each revolution.

The transmission 102 can also include a main case or housing 136 that encloses clutch plates and reaction plates, gears, hubs, pistons, shafts, and other housings. The transmission 102 can further include a turbine shaft (not shown) which rotates various clutches in the transmission. A gear or tonewheel (not shown) can be coupled to the turbine shaft (not shown) such that the turbine speed sensor 128, which couples to the main case or housing 136, measures the rotational speed of the gear or tonewheel (not shown). Other transmissions can include alternative ways known to the skilled artisan for measuring turbine speed.

In one embodiment, the transmission 102 includes an output shaft (not shown) which is enclosed by a rear cover 138 of the transmission 102. The output shaft (not shown) can couple to an output yoke (not shown) or other connection means. The output yoke, for example, couples the output of the transmission 102 to a driveline of the vehicle. To measure the output speed of the transmission 102, the output speed sensor 130 can couple to the rear cover 138. A smaller gear or tonewheel (not shown) can be coupled to the output shaft (not shown) such that the output shaft and gear or tonewheel rotate together. The output speed sensor 130 is aligned with the gear or tonewheel and measures the rotational speed of the output shaft. Thus, over a given period of time, the output speed of the transmission is measured.

Transmission shift schedules are included in software which is downloaded to the TCM 104. The TCM 104 can select a shift schedule depending on a vehicle's driving condition and implement the downloaded software by sending signals through the wiring harness 106 to control the transmission 102. The TCM 104 also receives measurement data from the transmission 102 such as, for example, input speed from the input speed sensor 126, turbine speed from the turbine speed sensor 128, and output speed from the output speed sensor 130. In an embodiment in which the transmission does not include a torque converter 132, the transmission may only have an input speed sensor 126 and output speed sensor 130. The TCM 104 can also calculate various parameters including transmission gear ratio or range, which is typically the ratio of input speed to output speed. In an embodiment in which the transmission 102 has a torque converter 132, the transmission gear ratio or range can also be determined by the ratio of turbine speed to output speed.

The TCM 104 also receives throttle percentage from a throttle input source, which can be coupled to an engine control module (ECM) for transmitting throttle data over a datalink. Examples of a conventional datalink include J1587 datalink, J1939 datalink, IESCAN datalink, Hardwire TPS (throttle position sensor) to TCM, and Hardwire PWM (pulse width modulation) to TCM. Unlike engine torque data, for example, which is communicated from the ECM to the TCM, throttle data is communicated over the datalink and is not limited to a particular engine/transmission configuration. Instead, the datalink can be adapted to most vehicle setups.

In view of this, an acceleration-based software is provided which can utilize transmission data to select a transmission shift schedule. The acceleration-based software is downloaded to the TCM 104 and communicates to the TCM 104 whether a transmission 102 operates according to an economy shift schedule or performance shift schedule. The economy shift schedule may be selected, for example, when the TCM detects the vehicle is unloaded or is able to accelerate quickly. In this case, the TCM selects the economy shift schedule, which can provide the vehicle with better fuel efficiency. To implement the economy shift schedule, for example, the TCM may command a shift from a higher gear ratio to a lower gear ratio at a lower output speed than if the TCM was commanding the same shift based on the performance shift schedule. On the other hand, if the TCM detects the vehicle is unable to accelerate quickly and thus predicts the vehicle is loaded or ascending a steep grade, the TCM selects the performance shift schedule. To implement a performance shift schedule, for example, the TCM may command a shift from a lower gear ratio to a higher gear ratio at a higher output speed than if the TCM were commanding the same shift based on the economy shift schedule. At a higher gear ratio, the transmission produces greater torque, for example, to move a loaded vehicle or assist a vehicle as it ascends a steep grade.

Figure 2:
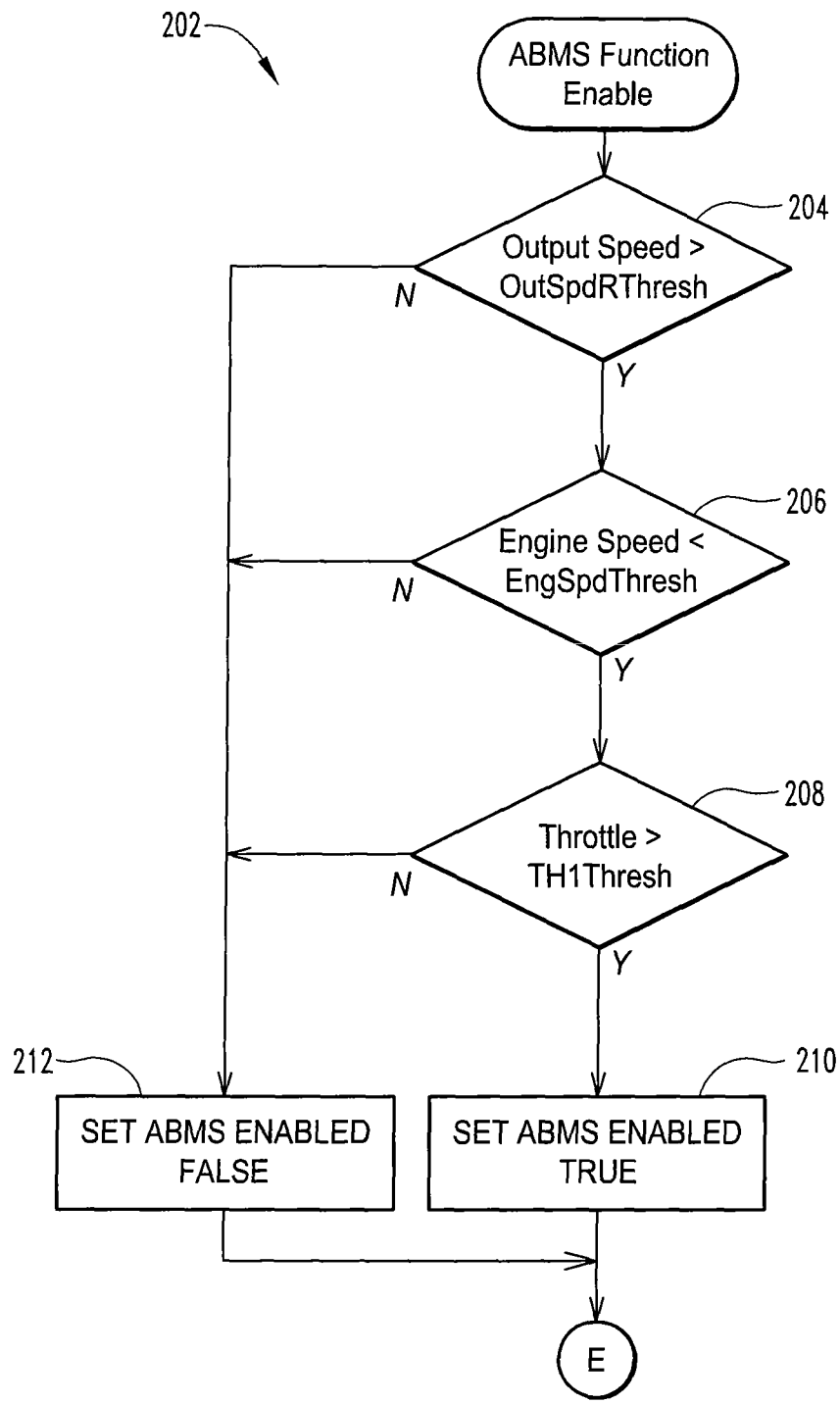
FIGS. 2-3 are flowcharts of an embodiment for enabling an acceleration-based software.
Figure 3:
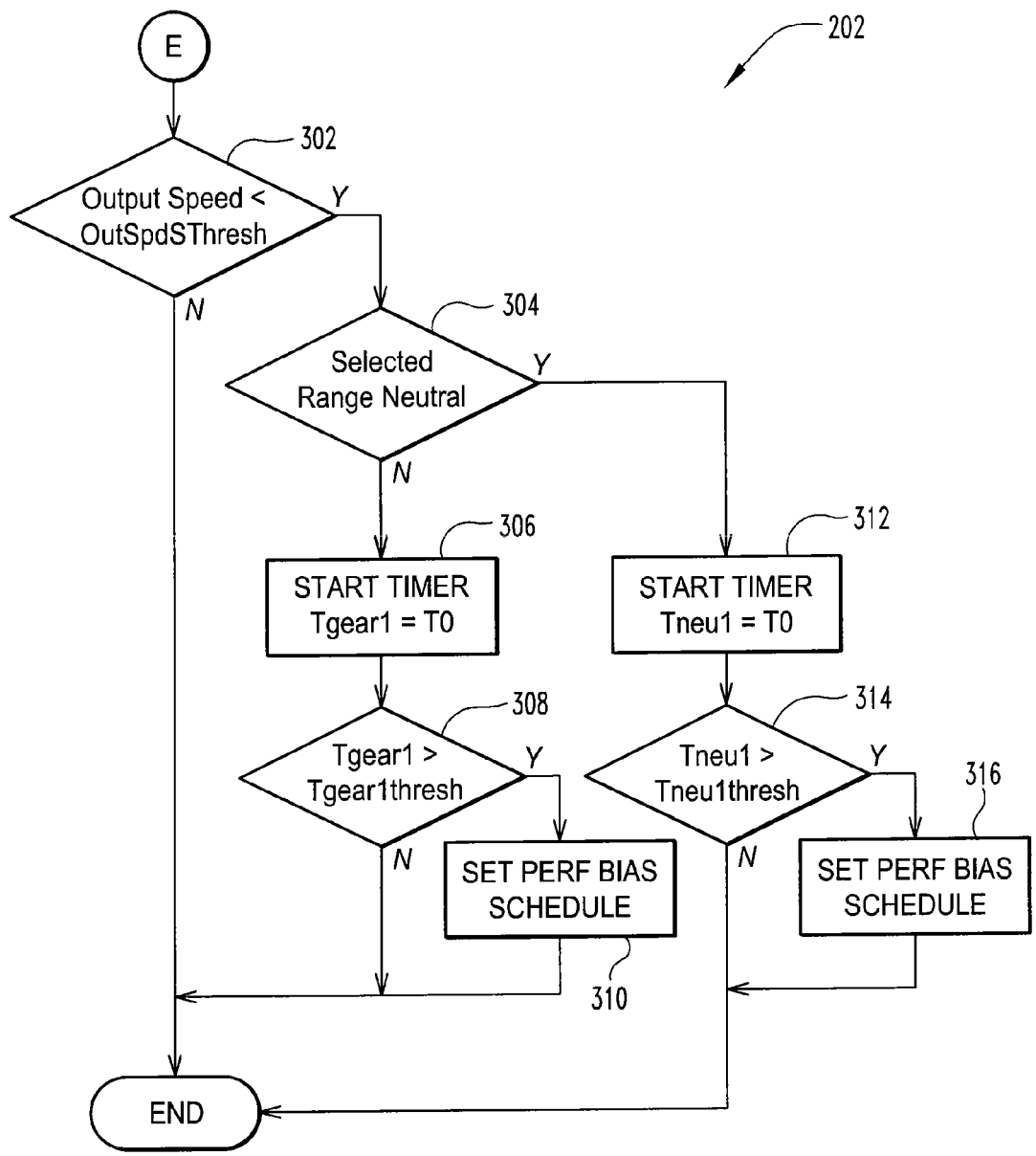

An exemplary embodiment of a method 202 for enabling the acceleration-based software is shown in FIGS. 2-3. In FIGS. 2-6, the acceleration-based software is labelled "ABMS," but ABMS can be an algorithm or mini-program, for example, contained within a software program. Alternatively, ABMS can be the main software program downloaded to the TCM. In step 204, method 202 determines whether the transmission output speed exceeds a threshold, referred to as "OutSpdRThresh." In one non-limiting example, OutSpdRThresh is approximately 100 RPM. OutSpdRThresh is defined in the software as a relatively low value which ensures the vehicle is moving before enabling ABMS. Thus, during operation, the output speed sensor 130 measures the transmission output speed and communicates the measurement to the TCM 104. If the measured output speed exceeds OutSpdRThresh, method 202 continues to step 206. If, however, the measured output speed falls below OutSpdRThresh, method 202 proceeds to step 212 and ABMS is not enabled.

To enable ABMS, the method 202 also requires the engine or input speed to not exceed a threshold, referred to as "EngSpdThresh," to ensure the engine is operating below a maximum speed. This maximum speed can be the engine governing speed, for example, or any other engine speed defined by the transmission software. In one non-limiting example, EngSpdThresh is set at approximately 2500 RPM. As described above with reference to FIG. 1, the engine speed is measured by the engine speed sensor 126. Thus, step 206 of method 202 compares the measured engine speed to EngSpdThresh, and if the measured engine speed is below the threshold method 202 continues to step 208. If, however, the measured engine speed is above EngSpdThresh, method 202 continues to step 212 and ABMS is not enabled.

Method 202 also requires the throttle percentage to be above a certain throttle threshold, referred to as "TH1Thresh," to ensure the engine is generating power. As described above, the TCM receives throttle data from the throttle input source. In one non-limiting example, TH1Thresh can be set between 25-35%. Step 208 of the method 202 compares the throttle percentage to TH1Thresh, and if the throttle percentage exceeds the threshold, method 202 continues to step 210 which enables ABMS. If the throttle percentage is below TH1thresh, then method 202 proceeds to step 212 and ABMS is not enabled. Whether ABMS is enabled in step 210 or not enabled in step 212, method 202 continues to step 302 (FIG. 3).

While method 202 has been described in one embodiment as performing steps 204, 206, and 208 individually, in another embodiment method 202 performs each of the steps 204, 206, and 208 in a single step. In other embodiments, the TCM can perform steps 204, 206, and 208 in any order. In other words, the order by which steps 204, 206, and 208 are performed is not critical for enabling ABMS. In a further embodiment, steps 204, 206, and 208 are performed continuously over a given period of time, and if each of the conditions set forth in steps 204, 206, and 208 are satisfied over the period of time, ABMS is enabled. Otherwise, the acceleration-based software is not enabled. In addition, once ABMS is enabled, the TCM continuously performs steps 204, 206, and 208. If one or more of the conditions set forth in steps 204, 206, and 208 is not satisfied, ABMS is disabled until each of the conditions are satisfied.

In step 302, which is shown in FIG. 3, the TCM again checks the vehicle output speed. In step 302, for example, ABMS checks to determine whether the vehicle is slowing down at a traffic light, stop sign, or other driving-related condition. For instance, the vehicle may stop at a stop light for 45 seconds but the transmission remains in first gear. Alternatively, the vehicle may stop at a loading dock for 30 minutes in which the vehicle is either loaded or unloaded (i.e., the weight of the vehicle changes). In this case, the transmission may shift into neutral. Each of these conditions affects whether ABMS wants to change the selected shift schedule to a performance shift schedule or, if the transmission is already operating in an economy shift schedule, maintain the transmission operating in the economy shift schedule.

Therefore, in step 302, the TCM determines whether the vehicle is slowing down such that the output speed falls below a second output speed threshold referred to as "OutSpdSThresh." In one non-limiting example, OutSpdSThresh is set at approximately 50 RPM. If the vehicle is not slowing down and the measured output speed exceeds OutSpdSThresh, then method 202 ends and the transmission operates according to the shift schedule selected previous to step 302. If, however, the vehicle is slowing down and the output speed sensor 130 of the transmission 102 measures the output speed below threshold OutSpdSThresh, method 202 proceeds to step 304. In step 304, the TCM determines whether the transmission has shifted into neutral. If the transmission is in neutral, method 202 proceeds to steps 312 and 314 in which the internal timer of the TCM sets time variable Tneu1=0 and starts the internal timer. Timing threshold, Tneu1thresh, can be set to any time duration. In one embodiment, Tneu1thresh is defined between 30-60 seconds. In other embodiments, Tneu1thresh can be defined as several seconds to several hours. If the TCM detects the transmission 102 is in neutral and time variable Tneu1 exceeds Tneu1thresh in step 314, method 202 continues to step 316 and the TCM selects and implements the performance shift schedule. If the condition in step 314 is not satisfied, e.g., the transmission shifts out of neutral, the performance shift schedule is not selected in step 316 and method 202 ends.

If, in step 304, the TCM determines the transmission has not shifted into neutral, method 202 continues to steps 306 and 308. For example, if the vehicle is slowing down and stopping at a traffic light, the transmission may not shift out of gear even though the output speed falls below threshold OutSpdSThresh in step 302. For this reason, ABMS does not change the shift schedule of the transmission unless the output speed remains below OutSpdSThresh and time variable Tgear1 exceeds timing threshold Tgear1thresh in step 308. In step 306, the TCM sets the internal timer, Tgear1=0, and starts the internal timer. Timing threshold, Tgear1thresh, can be longer than timing threshold, Tneu1thresh. In one embodiment, Tgear1thresh can be set between 1-3 minutes. In another embodiment, Tgear1thresh can be defined as a different waiting period. If the conditions set forth in steps 302 and 308 are satisfied, ABMS determines the vehicle has stopped for a reason other than a stop sign or traffic light and method 202 proceeds to step 310 in which the TCM selects and implements the performance shift schedule. If the output speed falls below threshold OutSpdSThresh, but before the condition in step 308 is completed the output speed increases above OutSpdSThresh, method 202 skips step 310 and ends. For example, the traffic light may suddenly change from red to green and the vehicle operator responds to the traffic light change by applying pressure to the accelerator pedal to increase vehicle speed.

Once ABMS is enabled, vehicle acceleration can be used to predict vehicle load, grade, power, and capability to determine whether the transmission should operate according to an economy shift schedule or performance shift schedule. As noted above, an advantage of using vehicle acceleration is that only internal TCM variables (e.g., engine or input speed, output speed, throttle percentage, output acceleration, transmission range, and threshold values) are required for determining the type of shift schedule the transmission should follow. In other words, engine torque and other non-transmission data or measurements which are required for selecting shift schedules in a conventional transmission are unnecessary when ABMS is enabled.

An exemplary embodiment illustrating how the TCM selects an economy or performance shift schedule is described with reference to FIGS. 4-6. Once ABMS is enabled, a method 402 for selecting an economy shift schedule or performance shift schedule is provided. The method 402 requires the TCM to receive throttle percentage, calculate transmission gear ratio or range, and calculate output acceleration. As noted above, the transmission gear ratio or range, e.g., neutral, first range, second range, etc., is the ratio of the engine or input speed to output speed. In an embodiment in which the transmission includes a torque converter, the transmission gear ratio or range can be computed as the ratio of turbine speed to output speed. Thus, depending on the embodiment, the engine or input speed sensor 126 of FIG. 1 measures transmission input speed (i.e., engine speed), the turbine speed sensor 128 measures turbine speed, and the output speed sensor 130 measures transmission output speed. As for output acceleration, the transmission output speed is measured by the output speed sensor 130 over a time period and the measured output speed is then divided by that time period.

Figure 4:
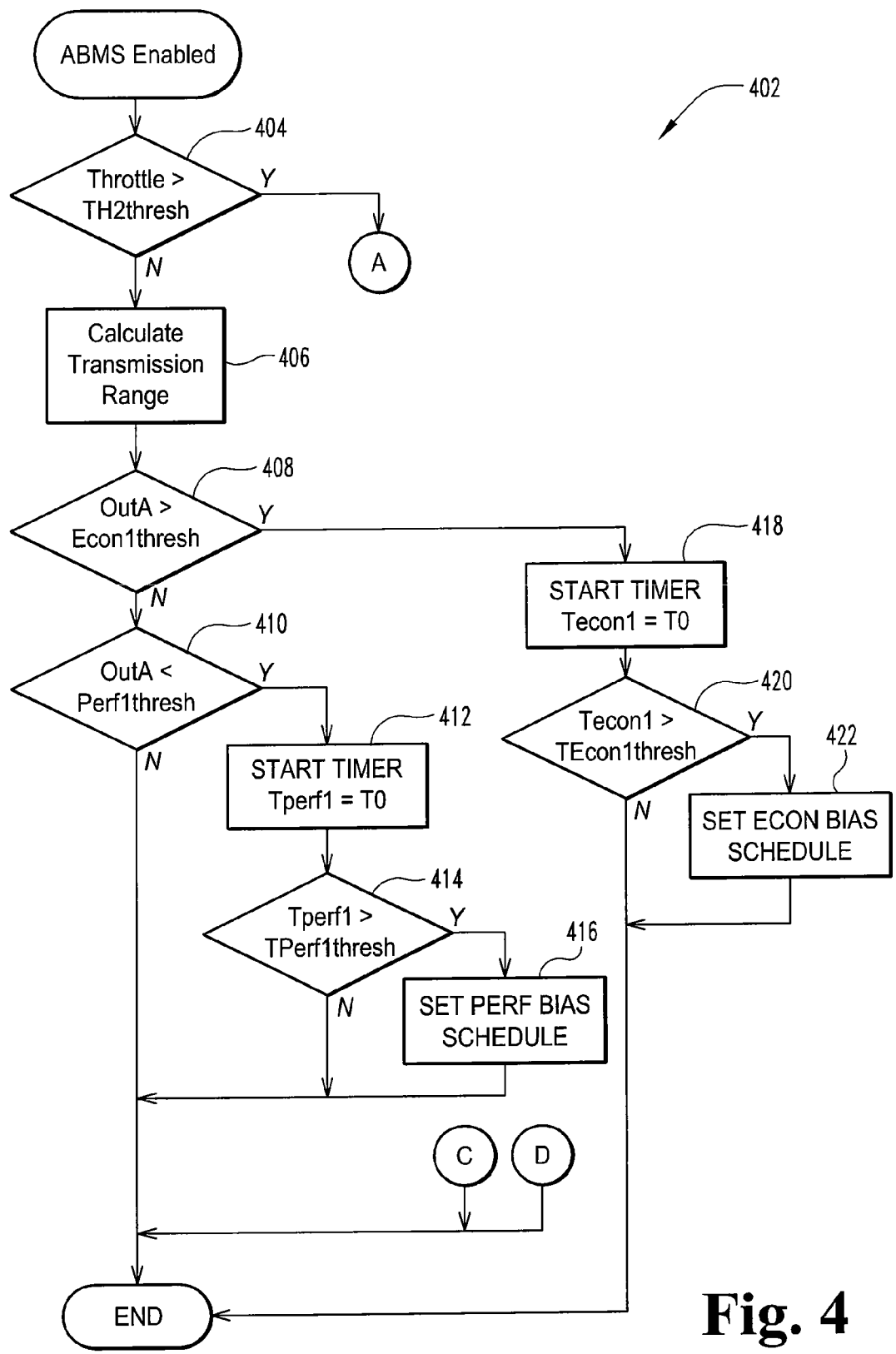
FIGS. 4-6 are flowcharts of an exemplary embodiment for selecting a transmission shift schedule.
Figure 5:
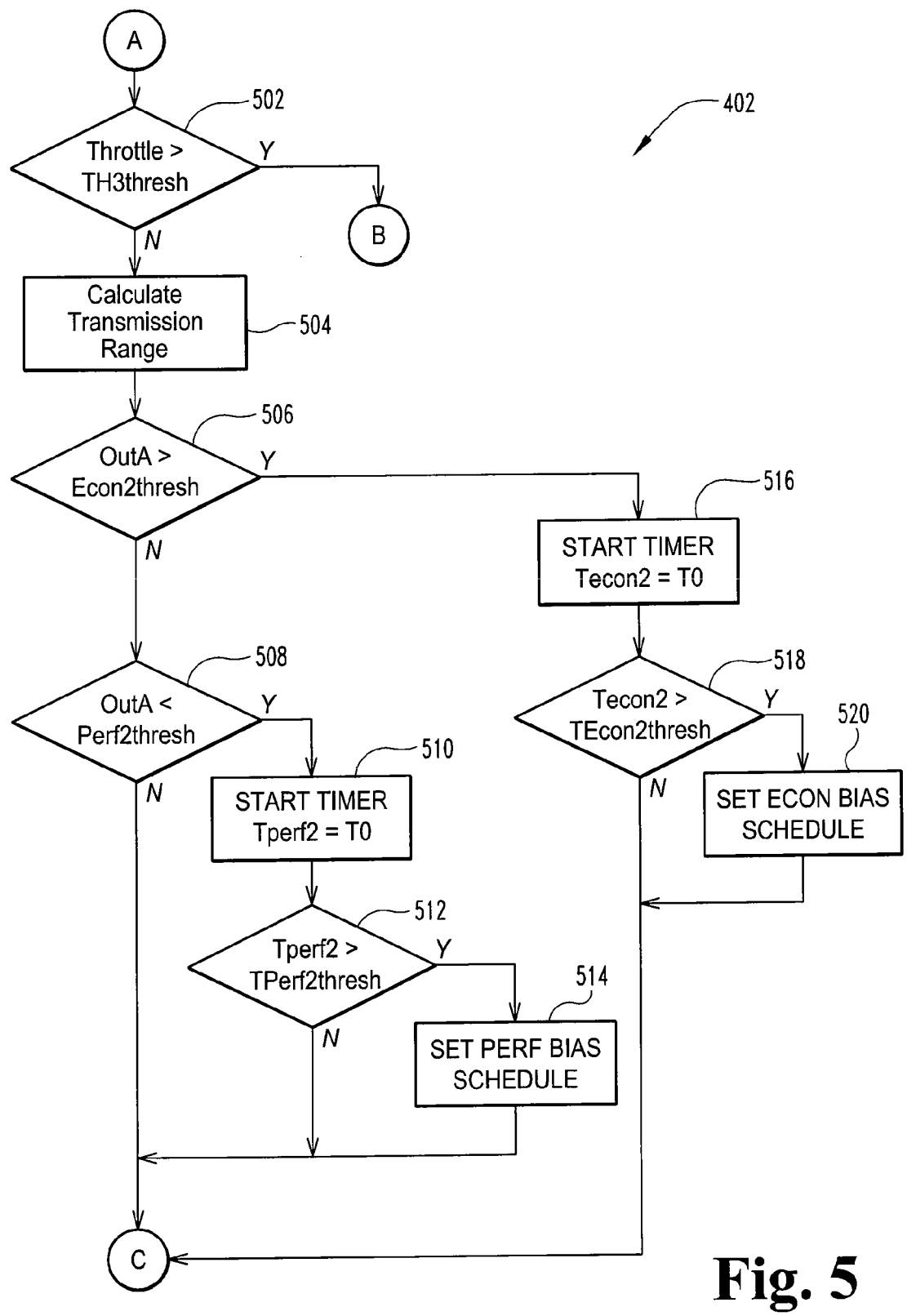

In FIG. 4, for example, method 402 includes step 404 which compares the throttle percentage received by the TCM to a throttle threshold, TH2thresh. If the throttle percentage exceeds TH2thresh, method 402 continues to step 502 (see FIG. 5). If, however, the throttle percentage does not exceed TH2thresh, method 402 proceeds to step 406 in which the transmission range is determined as explained above. Once the transmission range is determined, method 402 continues to step 408 and the TCM compares output acceleration to an economy-based output acceleration threshold, Econ1thresh. ABMS defines output acceleration threshold variables, Econ1thresh and Perf1thresh, based on throttle percentage and transmission range. In some instances, method 402 requires the TCM to interpolate between different throttle percentages for a given transmission range to determine the appropriate Econ1thresh and Perf1thresh value.

Once the TCM determines the Econ1thresh value from the software, the calculated output acceleration is compared to Econ1thresh in step 408. If the calculated output acceleration exceeds Econ1thresh, method 402 continues to step 418. Otherwise, method 402 proceeds to step 410 in which the calculated output acceleration is compared to performance-based threshold, Perf1thresh. If the calculated output acceleration exceeds Perf1thresh in step 410, method 402 concludes and the transmission remains operating in the current shift schedule. Also, the TCM continuously receives throttle percentage from the throttle input source and performs step 404. If the condition set forth in step 404 is not satisfied, i.e., the throttle percentage increases above threshold TH2thresh, method 402 proceeds to step 502 (since the condition in step 404 is not met). In other words, if the vehicle operator applies more pressure to the accelerator pedal such that the throttle percentage received from the throttle input source exceeds TH2thresh, the condition set forth in step 404 is no longer satisfied and method 402 proceeds to step 502 (FIG. 5).

If method 402 proceeds to step 418, such that the calculated output acceleration exceeds Econ1thresh, the TCM sets internal timer, Tecon1=0, and starts the internal timer. The waiting period, referred to as "TEcon1thresh," is a timing threshold defined by ABMS and can be several milliseconds to several seconds in duration. This, of course, is not intended to be limiting and other embodiments of the software can have different timing thresholds. For an economy shift schedule to be selected, the calculated output acceleration must continuously exceed threshold Econ1thresh throughout the duration of the waiting period, which is monitored in step 420. Also, the conditions in steps 404 and 408 must continuously be met. In other words, steps 404 and 408 are continuously repeated until step 420 is satisfied. Once the waiting period expires, i.e., Tecon1 exceeds timing threshold TEcon1thresh, method 402 will continue to step 422. Otherwise, method 402 will end without selecting the economy shift schedule. If method 402 does continue to step 422, ABMS selects the economy shift schedule and the TCM 104 controls the transmission 102 accordingly. In this instance, the vehicle may be unloaded and accelerating at a rate in which the TCM determines the transmission can operate in the economy shift schedule to provide better fuel efficiency to the vehicle.

If, instead method 402 proceeds to step 410, the calculated output acceleration is compared to threshold Perf1thresh. If the output acceleration falls below the threshold, method 402 continues to step 412 and the TCM sets the internal timer, Tperf1=0 and starts the internal timer. Again, similar to step 420, the throttle percentage and output acceleration are continuously compared to thresholds TH2thresh and Perf1thresh, respectively, over a waiting period. The waiting period is defined as TPerf1thresh and the timer counts up in step 414 until time variable Tperf1 exceeds threshold TPerf1thresh. So long as the conditions in steps 404 and 410 are met during waiting period TPerf1thresh, ABMS selects the performance shift schedule in step 416 and method 402 concludes. Otherwise, method 402 ends without selecting the performance shift schedule. For instance, the vehicle operator may suddenly press firmly on the accelerator pedal such that the output acceleration exceeds Perf1thresh, thereby causing the TCM not to select the performance shift schedule and instead the transmission continues to operate in the current shift schedule. If ABMS is still enabled, method 402 restarts at step 404 and the throttle percentage received from the throttle input source is again compared to TH2thresh in step 404.

As described above, if the throttle percentage received by the TCM 104 is greater than throttle threshold, TH2thresh, method 402 proceeds to step 502 (see FIG. 5) in which the throttle percentage is compared to a second throttle threshold, TH3thresh. In this embodiment, TH3thresh is greater than both TH1thresh and TH2thresh. If the throttle percentage exceeds TH3thresh, method 402 continues to step 602 (see FIG. 6). If, however, the throttle percentage is less than TH3thresh, method 402 continues to step 504 in which the transmission gear ratio or range is calculated by the TCM as previously described. Once again, ABMS defines output acceleration threshold values for both the economy shift schedule (i.e., Econ2thresh) and performance shift schedule (i.e., Perf2thresh) based on the throttle percentage. The TCM may have to interpolate between different threshold values to determine both Econ2thresh and Perf2thresh, as both of these threshold values are based on throttle percentage. ABMS can define both Econ2thresh and Perf2thresh based on a particular throttle percentage, and if during operation the TCM receives a different throttle percentage from the throttle input source, the TCM can interpolate between two throttle data points to determine the appropriate threshold values. An example of how the TCM interpolates between different throttle data points is described in Example 2 below.

In step 506, the TCM calculates output acceleration and compares the calculated output acceleration to threshold Econ2thresh. If the calculated output acceleration exceeds Econ2thresh, method 402 continues to step 516. If, however, the calculated output acceleration is less than Econ2thresh, method 402 proceeds to step 508. Step 502 is continuously repeated to ensure the throttle percentage continues to exceed threshold TH2thresh but is less than threshold TH3thresh. For example, as a vehicle begins to ascend a steep grade, the vehicle operator may press more firmly on the accelerator pedal to provide more power to the vehicle. As such, the throttle percentage may increase above threshold TH3thresh causing method 402 to either restart at step 404 or go directly to step 602.

If method 402 proceeds to step 508, i.e., the calculated output acceleration is less than Econ2thresh, the calculated output acceleration is compared to Perf2thresh. If the calculated output acceleration is less than Perf2thresh, method 402 proceeds to step 510 and the TCM sets the internal timer, Tperf2=0, and starts the internal timer. The throttle percentage and output acceleration are continuously monitored over a waiting period, referred to as "TPerf2thresh" (which can be several milliseconds to several seconds). Once time variable Tperf2 exceeds TPerf2thresh in step 512, if the conditions in steps 502, 506, and 508 remain satisfied, method 402 continues to step 514 in which the performance shift schedule is selected. In the example given above in which the vehicle ascends a steep incline, the TCM is able to predict the steep grade by comparing the vehicle acceleration to different threshold values. As such, the TCM selects the performance shift schedule in step 514 such that the transmission operates in a higher gear ratio. Once the TCM selects the performance shift schedule, method 402 concludes until driving conditions change. If the conditions in steps 502, 506, or 508 are not satisfied, the performance shift schedule is not selected and method 402 ends or returns to whichever step is not satisfied.

If the calculated output acceleration in step 506 does exceed threshold Econ2thresh, method 402 continues to step 516. Here, the TCM sets internal timer, Tecon2=0, and starts the internal timer. The TCM continuously repeats steps 502 and 506 until Tecon2 exceeds waiting period, TEcon2thresh, in step 518. If the conditions in steps 502 and 506 are continuously met through the completion of step 518, the economy shift schedule is selected in step 520 and method 402 ends. Otherwise, the economy shift schedule is not selected and method 402 ends.

Figure 6:
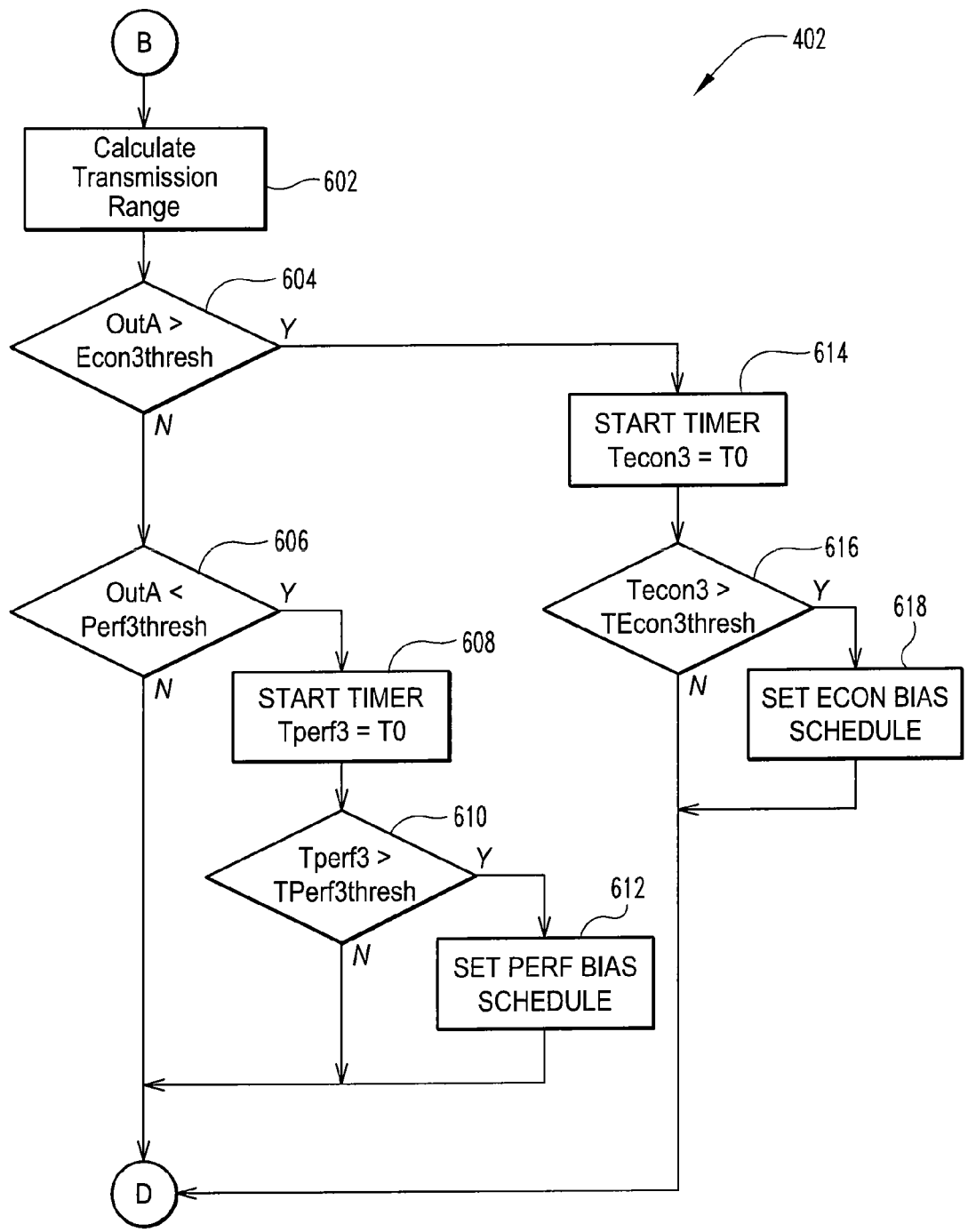

With reference to FIG. 6 of this embodiment, method 402 proceeds to step 602 if the throttle percentage received by the TCM 104 is greater than both throttle thresholds, TH2thresh and TH3thresh. In step 602, the TCM calculates the transmission gear ratio or range and determines output acceleration threshold values for both the economy shift schedule, i.e., Econ3thresh, and performance shift schedule, i.e., Perf3thresh, based on the calculated transmission range. As noted above, the TCM may have to interpolate between different threshold values to determine both Econ3thresh and Perf3thresh, as both of these threshold values are based on throttle percentage. ABMS can define both Econ3thresh and Perf3thresh based on a particular throttle percentage, and if during operation, the TCM receives a different throttle percentage, the TCM can interpolate between two throttle data points to determine the appropriate threshold values (e.g., see Example 2 below).

In step 604 of method 402, the calculated output acceleration is compared to output acceleration threshold variable Econ3thresh. If the calculated output acceleration is greater than Econ3thresh, the vehicle may be operating in a condition favorable to the TCM selecting the economy shift schedule. As such, method 402 proceeds to step 614. Otherwise, method 402 continues to step 606 to determine whether the calculated output acceleration is less than output acceleration threshold, Perf3thresh. If so, the vehicle may be operating in a condition more favorable to the TCM selecting the performance shift schedule. The TCM also continues to receive the throttle percentage from the throttle input source. As the output acceleration is calculated and monitored by the TCM, the TCM also continuously performs steps 404 and 502. If the vehicle operator releases the accelerator pedal, for example, such that throttle percentage decreases below either threshold TH2thresh or TH3thresh, method 402 will restart at step 404.

In step 614, the TCM sets the internal timer, Tecon3=0, and starts the internal timer. Step 604 is continuously repeated until either time variable Tecon3 exceeds timing threshold TEcon3thresh in step 616 or step 604 fails, i.e., the calculated output acceleration no longer is greater than threshold Econ3thresh. This may happen, for example, if the vehicle begins to ascend a steep hill. If step 616 is successfully completed and the calculated output acceleration continues to exceed threshold Econ3thresh, ABMS selects the economy shift schedule in step 618 and method 402 concludes. If, however, step 616 is not successfully completed, the economy shift schedule is not selected and method 402 ends.

Likewise, if step 606 is completed successfully, i.e., the calculated output acceleration is less than threshold Perf3thresh, the TCM sets internal timer, Tperf3=0, in step 608 and starts the internal timer. Step 606 is continuously repeated until either the condition set forth in step 606 fails, in which case method 402 ends, or time variable Tperf3 satisfies the condition in step 610 and exceeds timing threshold TPerf3thresh. If step 610 is successfully completed, method 402 proceeds to step 612 such that ABMS triggers the TCM to operate the transmission according to the performance shift schedule. After step 612, method 402 is completed.

Method 402 has been described in a step-by-step order, but during vehicle operation, driving conditions can change at any moment. As a result, ABMS adapts quickly to changing driving conditions such that method 402 can be at step 410, for example, when the vehicle operator presses down on the accelerator pedal and full open throttle is obtained (i.e., 100% throttle). In this example, the conditions in steps 404 and 502 are not satisfied and method 402 proceeds directly to step 602. Thus, the TCM continuously monitors both the throttle percentage and output acceleration during method 402, and if either changes, method 402 restarts at step 404. Also, even though ABMS is enabled in step 210, changes in driving conditions may cause the criteria in steps 204, 206, or 208 to change. As a result, ABMS can become disabled at any moment, and therefore the TCM can continuously repeat method 202 at the same time as method 402 is performed.

EXAMPLES

Five examples are provided below to further explain the features of ABMS described in FIGS. 2-6. These examples are not intended to be limiting, and the values assigned in Table 1 below for each variable are only exemplary.

TABLE 1

Sample Variables and Transmission Data for Examples 1-5

| Variable | Example 1 | Example 2 | Example 3 | Example 4 | Example 5 |
|---|---|---|---|---|---|
| Output Speed | 2100 RPM | 1225 RPM | 1875 RPM | 850 RPM | 500 RPM, 25 RPM |
| OutSpdRThresh | 100 RPM | 100 RPM | 100 RPM | 100 RPM | 100 RPM |
| Engine Speed | 2100 RPM | 2200 RPM | 1500 RPM | 1200 RPM | 2200 RPM |
| EngSpdThresh | 2500 RPM | 2500 RPM | 2500 RPM | 2500 RPM | 2500 RPM |
| Throttle percentage | 100% | 75% | 50% | 25% | 35% |
| TH1Thresh | 30% | 30% | 30% | 30% | 30% |
| TH2thresh | 60% | 60% | 60% | 60% | 60% |
| TH3thresh | 90% | 90% | 90% | 90% | 90% |
| Output Acceleration (OutA) | 1 rev/s$^2$ | 10 rev/s$^2$ | 6 rev/s$^2$ | 5 rev/s$^2$ | 3 rev/s$^2$ |
| Transmission Range | Drive | Drive | Drive | Drive | Drive |
| Econ1thresh | 5 rev/s$^2$ | 5 rev/s$^2$ | 5 rev/s$^2$ | 5 rev/s$^2$ | 5 rev/s$^2$ |
| Perf1thresh | 2 rev/s$^2$ | 2 rev/s$^2$ | 2 rev/s$^2$ | 2 rev/s$^2$ | 2 rev/s$^2$ |
| TEcon1thresh | 0.5 secs | 0.5 secs | 0.5 secs | 0.5 secs | 0.5 secs |
| TPerf1thresh | 0.5 secs | 0.5 secs | 0.5 secs | 0.5 secs | 0.5 secs |
| Econ2thresh | 5 rev/s$^2$ | 5 rev/s$^2$ | 5 rev/s$^2$ | 5 rev/s$^2$ | 5 rev/s$^2$ |
| Perf2thresh | 2 rev/s$^2$ | 2 rev/s$^2$ | 2 rev/s$^2$ | 2 rev/s$^2$ | 2 rev/s$^2$ |
| TEcon2thresh | 0.5 secs | 0.5 secs | 0.5 secs | 0.5 secs | 0.5 secs |
| TPerf2thresh | 0.5 secs | 0.5 secs | 0.5 secs | 0.5 secs | 0.5 secs |
| Econ3thresh | 5 rev/s$^2$ | 5 rev/s$^2$ | 5 rev/s$^2$ | 5 rev/s$^2$ | 5 rev/s$^2$ |
| Perf3thresh | 2 rev/s$^2$ | 2 rev/s$^2$ | 2 rev/s$^2$ | 2 rev/s$^2$ | 2 rev/s$^2$ |
| TEcon3thresh | 0.5 secs | 0.5 secs | 0.5 secs | 0.5 secs | 0.5 secs |
| TPerf3thresh | 0.5 secs | 0.5 secs | 0.5 secs | 0.5 secs | 0.5 secs |
| OutSpdSThresh | 50 RPM | 50 RPM | 50 RPM | 50 RPM | 50 RPM |
| Tgear1thresh | 120 secs | 120 secs | 120 secs | 120 secs | 120 secs |
| Tneu1thresh | 30 secs | 30 secs | 30 secs | 30 secs | 30 secs |

Example 1

With reference to Table 1 above (under the column labeled "Example 1") and FIG. 2, before an economy or performance shift schedule can be selected, the TCM determines whether ABMS is enabled. To do so, the TCM monitors the conditions set forth in steps 204, 206, and 208 of FIG. 2. In step 204, the output speed measured by the output speed sensor of the transmission must exceed the output speed threshold, OutSpdRThresh. From Table 1, the output speed measured 2100 RPM, which is greater than the threshold OutSpdRThresh of 100 RPM, and therefore the criteria set forth in step 204 is satisfied. As for the condition set forth in step 206, the engine speed measured 2100 RPM, which is less than the engine speed threshold, EngSpdThresh, of 2500 RPM. Thus, the condition set forth in step 206 is satisfied. Finally, step 208 requires throttle percentage to exceed throttle threshold, TH1Thresh. The TCM received 100% throttle from the throttle input source. 100% throttle exceeds the throttle threshold amount of 30% and therefore the condition set forth in step 208 is satisfied. Since the criteria set forth in steps 204, 206, and 208 are satisfied, ABMS is enabled in step 210. As noted above, even though ABMS is enabled, the TCM continuously monitors the three criteria set forth in steps 204, 206, and 208 and if at any time one or more of these conditions change (i.e., are not satisfied), ABMS becomes disabled until all three conditions are satisfied again.

Once ABMS is enabled, method 202 continues to step 302 to compare the measured output speed to output speed threshold, OutSpdSThresh. From Table 1, output speed measured 2100 RPM and ABMS defined OutSpdSThresh as 50 RPM. Since the measured output speed exceeds output speed threshold OutSpdSThresh, method 202 is completed.

Next, the method 402 for selecting the economy or performance shift schedule begins with step 404. Once again, the throttle percentage transmitted to the TCM from the throttle input source is 100%, which exceeds throttle threshold, TH2thresh, of 60%. Thus, method 402 continues to step 502 and again the 100% throttle exceeds throttle threshold, TH3thresh, of 90%. Method 402 therefore proceeds to step 602 in which the TCM calculates the transmission range (or gear ratio). The transmission range (or gear ratio) is computed as 1.0 (which may correspond, for example, to $4^{th}$ range). Based on this transmission range, ABMS provides the TCM with output acceleration threshold values that correlate with 100% throttle. In step 604, the TCM calculates the output acceleration as 1 rev/s$^2$ and compares the calculated output acceleration to output acceleration threshold, Econ3thresh. ABMS defines Econ3thresh as 5 rev/s$^2$, which is greater than the calculated output acceleration of 1 rev/s$^2$. The condition set forth in step 604 therefore is not satisfied and method 402 proceeds to step 606. As such, due to the low vehicle acceleration, ABMS predicts that the vehicle may be loaded or is ascending a steep grade, for example, and thus the present driving conditions are not ideal for an economy-based shift schedule.

The condition set forth in step 606 requires the calculated output acceleration to be less than threshold variable, Perf3thresh. Once again, ABMS defines output acceleration threshold variable, Perf3thresh, such that if the vehicle acceleration is below this threshold variable, ABMS predicts or assumes the vehicle is loaded or is encountering driving conditions that require a performance-based shift schedule. In this example, the calculated output acceleration of 1 rev/s$^2$ is less than the output acceleration threshold Perf3thresh of 2 rev/s$^2$ and therefore the condition set forth in step 606 is satisfied. As such, method 402 continues to steps 608 and 610. In step 608, the TCM sets an internal timer to initiate a delay or waiting period to ensure that the condition set forth in step 606 remains satisfied. The delay or waiting period is defined by timing threshold, TPerf3thresh, which in this example is 0.5 seconds. During the delay or waiting period, step 606 is continuously repeated and the throttle percentage is continuously compared to throttle threshold variables, TH1Thresh, TH2thresh, and TH3thresh. If the throttle percentage or output acceleration changes such that one of these conditions no longer is met, step 610 is terminated and either method 402 ends or ABMS is disabled (e.g., if the throttle percentage falls below threshold TH1Thresh).

In the present example, however, the throttle percentage and output acceleration remain constant throughout the duration of the delay or waiting period, and therefore step 610 is satisfied. Method 402 then proceeds to step 612 in which the TCM selects the performance shift schedule. Once the performance shift schedule is selected, method 402 reaches its conclusion and the transmission operates in the performance shift schedule until the driving conditions change causing ABMS to disable or method 402 to restart at step 404.

Example 2

Following the same process as in Example 1 above, ABMS is enabled if the criteria set forth in steps 204, 206, and 208 are met. In step 204, the output speed measures 1225 RPM (see the Column labeled "Example 2" in Table 1 above) and the output speed threshold, OutSpdRThresh, is 100 RPM. Thus, the condition in step 204 is satisfied as the output speed exceeds the output speed threshold. In step 206, the engine speed measures 2200 RPM, which is less than the engine speed threshold, EngSpdThresh, of 2500 RPM. The condition in step 206 is therefore satisfied as well. Finally, in step 208, the throttle percentage is 75% and this exceeds the throttle threshold, TH1Thresh, of 30%. The condition set forth in step 208 is satisfied, and since each of the conditions in steps 204, 206, and 208 are met, ABMS is enabled in step 210. Following step 210, method 202 continues to step 302 and the measured output speed is compared to output speed threshold, OutSpdSThresh. Since the output speed measures 1225 RPM and this is greater than OutSpdSThresh of 50 RPM, method 202 reaches its conclusion.

Once ABMS is enabled, the method 402 for selecting an economy or performance shift schedule starts at step 404. In step 404, since the 75% throttle exceeds the throttle threshold, TH2thresh, of 60%, method 402 proceeds to step 502. Here, since the 75% throttle is less than the throttle threshold, TH3thresh, of 90%, method 402 continues to step 504 and the transmission range (or gear ratio) is calculated. The transmission range is calculated as 1.8 (which may correspond, for example, to 2$^{nd}$ range), and based on the 75% throttle and transmission range, the TCM determines the output acceleration threshold values as defined by ABMS. As noted above, the TCM may have to interpolate between different throttle data points to determine output acceleration threshold variables, Econ2thresh and Perf2thresh. For example, ABMS may define threshold variable, Econ2thresh, as being 4 rev/s$^2$ at 60% throttle and 6 rev/s$^2$ at 90% throttle. In the present example, at 75% throttle the TCM can interpolate between the throttle percentage data points and determine Econ2thresh to be 5 rev/s$^2$.

Once the transmission range has been calculated and the TCM has determined the output acceleration threshold values, method 402 continues to step 506 in which the TCM calculates output acceleration and compares the calculated output acceleration to threshold, Econ2thresh. The TCM calculates the output acceleration to be 10 rev/s$^2$, which is greater than the defined output acceleration threshold, Econ2thresh, of 5 rev/s$^2$. Since the condition set forth in step 506 is satisfied, method 402 proceeds to steps 516 and 518. In step 516, the TCM sets an internal timer to initiate a delay or waiting period to ensure that the condition set forth in step 506 remains satisfied. The delay or waiting period is defined by timing threshold, TEcon2thresh, which in this example is 0.5 seconds. During the delay or waiting period, step 506 is continuously repeated and the throttle percentage is continuously compared to throttle threshold variables, TH1Thresh, TH2thresh, and TH3thresh. In this example, the output acceleration and throttle percentage remain constant through the duration of the waiting period, and thus the condition set forth in step 518 is satisfied. As such, method 402 proceeds to step 520 in which the economy shift schedule is selected. Once step 520 is completed, the transmission operates based on the economy shift schedule and method 402 is complete.

Example 3

The method 202 for enabling ABMS begins at steps 204, 206, and 208, each of which can be performed in any order or simultaneously in a single step. The condition in step 204 is met as the measured output speed is 1875 RPM, which is greater than output speed threshold, OutSpdRThresh, of 100 RPM. Likewise, the condition set forth in step 206 is met as the measured engine speed is 1500 RPM, which is less than the engine speed threshold, EngSpdThresh, of 2500 RPM. The condition in step 208 is also met as 50% throttle is greater than the throttle threshold, TH1Thresh, of 30%. Thus, the criteria in steps 204, 206, and 208 are satisfied and ABMS is enabled in step 210. Method 202 then proceeds to step 302 where the measured output speed again is compared to output speed threshold, OutSpdSThresh. Here, the measured output speed is 1875 RPM, which is greater than OutSpdSThresh of 50 RPM, and thus the condition set forth in step 302 is not satisfied. As such, method 202 is complete.

Once ABMS is enabled in step 210 and method 202 ends, the method 402 of selecting an economy or performance shift schedule begins at step 404. The condition set forth in step 404 is not met as the 50% throttle is less than throttle threshold, TH2thresh, of 60%. As such, method 402 proceeds to step 406 and the TCM calculates the transmission range (which is based on transmission gear ratio). Here, the gear ratio computes to 0.8 (engine speed/output speed or turbine speed/output speed), and ABMS defines output acceleration threshold values based on the calculated transmission range and throttle percentage. In step 408, the output acceleration threshold, Econ1thresh, is defined as 5 rev/s$^2$ (this may be an interpolated threshold value). The TCM calculates the output acceleration as 6 rev/s$^2$ and compares the calculated output acceleration to Econ1thresh. Since Econ1thresh is defined by ABMS as 5 rev/s$^2$, the TCM determines the condition in step 408 is satisfied and thus method 402 continues to steps 418 and 420. The TCM sets the internal timer, Tecon1=0, and begins a delay or waiting period in which steps 404 and 408 are continuously repeated. In this example, the driving conditions do not change such that the criteria set forth in steps 404 and 408 remain satisfied. Method 402 therefore continues to step 422 and the economy shift schedule is selected by the TCM. After step 422, method 402 concludes and the transmission operates according to the economy shift schedule.

Example 4

In a different example, the method 202 for enabling ABMS begins at steps 204, 206, and 208. In step 204, the output speed measures 850 RPM, which exceeds output speed threshold, OutSpdRThresh, of 100 RPM. The condition in step 204 therefore is satisfied. In step 206, the engine speed measures 1200 RPM, which is less than the engine speed threshold, EngSpdThresh, of 2500 RPM. Thus, the condition in step 206 is met. Finally, in step 208, the TCM receives throttle percentage from the throttle input source. The 25% throttle received by the TCM, however, is less than the throttle threshold, TH1Thresh, of 30%. The condition set forth in step 208 therefore is not satisfied, and as a result, method 202 continues to step 212 in which ABMS is not enabled. As driving conditions change, however, the TCM continues to monitor the output speed, engine speed, and throttle percentage such that when the criteria in steps 204, 206, and 208 are satisfied, ABMS can be enabled.

Example 5

In another example, the method 202 for enabling ABMS again begins at steps 204, 206, and 208. In step 204, the output speed measures 500 RPM, which is greater than the output speed threshold, OutSpdRThresh, of 100 RPM. Thus, the condition set forth in step 204 is met. The condition set forth in step 206 is also met as the measured engine speed is 2200 RPM, which is less than the engine speed threshold, EngSpdThresh, of 2500 RPM. Finally, the 35% throttle exceeds the throttle threshold, TH1Thresh, of 30% and therefore the condition is step 208 is satisfied. Since the criteria of steps 204, 206, and 208 are met, ABMS is enabled in step 210 and method 202 proceeds to step 302.

In this example, the vehicle is approaching a red traffic light. In the column labeled "Example 5" in Table 1 above, the output speed initially measured 500 RPM. As the vehicle approaches the traffic light, however, the measured output speed decreases to 25 RPM. As such, the condition in step 204 is no longer satisfied as the TCM determines the measured output speed of 25 RPM is less than the output speed threshold, OutSpdRThresh, which is 100 RPM. ABMS is disabled in step 212 and method 202 continues to step 302. Here, the measured output speed of 25 RPM is less than the output speed threshold, OutSpdSThresh, of 50 RPM and thus method 202 proceeds to step 304.

In step 304, the TCM determines if the transmission is operating in neutral. Since the vehicle is decelerating as it approaches the traffic light, the transmission is not shifted to neutral. Instead, the transmission continues to operate in drive and thus method 202 continues to steps 306 and 308. The TCM sets internal timer, Tgear1=0, and begins a delay or waiting period. The length of the waiting period is defined by ABMS as Tgear1thresh. In this non-limiting example, Tgear1thresh is defined as 120 seconds (i.e., 2 minutes). During the waiting period, the TCM continues to monitor the condition set forth in step 302. In the present example, the waiting period expires and the condition in step 302 remains unchanged such that the condition in step 308 is satisfied.

Therefore, method 202 proceeds to step 310 in which the TCM selects the performance shift schedule. Once the TCM selects the performance shift schedule in step 310, method 202 reaches the end. The TCM continues to measure output speed and engine speed and receives throttle percentage from the throttle input source. Thus, the TCM continues to perform steps 204, 206, and 208 until the conditions set forth in these steps are satisfied and ABMS is enabled.

While exemplary embodiments incorporating the principles of the present invention have been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of enabling acceleration based software by monitoring transmission data for a transmission in a vehicle, the transmission including at least an input speed sensor, an output speed sensor, a throttle position sensor, and a controller, the method comprising:
    storing a plurality of shift schedules and a plurality of predefined threshold values in the controller, wherein the plurality of predefined threshold values includes at least an input speed threshold, an output speed threshold, and a throttle position threshold;
    operably controlling the transmission according to one of the plurality of shift schedules;
    using the controller to receive electrical signals from the output speed sensor, the input speed sensor, and the throttle position sensor;
    using the output speed sensor to determine a measured output speed of the transmission;
    using the input speed sensor to determine a measured input speed of the transmission;
    using the throttle position sensor to determine a measured throttle position of the vehicle;
    comparing the measured output speed to the output speed threshold, the measured input speed to the input speed threshold, and the measured throttle position to the throttle position threshold;
    activating the acceleration based software based only on a result of the comparing step without considering vehicle acceleration; executing the acceleration based software after the activating step, wherein the executing the acceleration based software includes consideration of output acceleration; and
    operably controlling the transmission according to a different one of the plurality of shift schedules only if the acceleration based software is enabled.

2. The method of claim 1, further comprising selecting an economy shift schedule or performance shift schedule.

3. The method of claim 1, further comprising calculating output acceleration and comparing the calculated output acceleration to an output acceleration threshold.

4. The method of claim 3, further comprising determining the output acceleration threshold based on the measured throttle position and a transmission gear ratio.

5. The method of claim 3, further comprising determining an economy-based output acceleration threshold or a performance-based output acceleration threshold.

6. The method of claim 1, further comprising calculating a transmission gear ratio with the controller.

7. The method of claim 6, wherein calculating transmission gear ratio comprises dividing the measured input speed by the measured output speed.

8. The method of claim 6, further comprising measuring turbine speed with a turbine speed sensor.

9. The method of claim 8, wherein the transmission gear ratio is calculated as the ratio of the measured turbine speed to the measured output speed.

10. The method of claim 1, further comprising triggering a waiting period, wherein during the waiting period, the controller repeatedly receives the measured throttle position and calculates output acceleration.

11. The method of claim 10, wherein, during the waiting period, the measured throttle position is repeatedly compared to a second throttle threshold, and a calculated output acceleration is repeatedly compared to an output acceleration threshold.

12. The method of claim 11, wherein, after the waiting period, the controller selects the shift schedule.

13. The method of claim 1, further comprising implementing the selected shift schedule.

14. A method of executing an acceleration based software to select an economy based shift schedule or a performance based shift schedule for a transmission, the transmission including at least an input speed sensor, an output speed sensor, a throttle position sensor, and a controller, the method comprising:
storing a plurality of shift schedules and a plurality of predefined threshold values in the controller, wherein the plurality of predefined threshold values includes at least an input speed threshold, an output speed threshold, a time threshold, a plurality of throttle position thresholds, and a plurality of acceleration thresholds;
operably controlling the transmission according to one of the plurality of shift schedules;
using the controller to receive electrical signals from the output speed sensor, the input speed sensor, and the throttle position sensor;
using the output speed sensor to determine a measured output speed of the transmission;
using the input speed sensor to determine a measured input speed of the transmission;
using the throttle position sensor to determine a measured throttle position of the vehicle;
comparing the measured output speed to the output speed threshold, the measured input speed to the input speed threshold, and the measured throttle position to at least one of the plurality of throttle position thresholds; and
activating the acceleration based software based only on a result of the comparing step without considering vehicle acceleration;
once the acceleration based software is activated:
comparing the measured throttle position to at least one of the plurality of throttle thresholds;
determining a transmission range;
determining an output acceleration and comparing the output acceleration to at least one of the plurality of acceleration thresholds;
enabling a timer to trigger a waiting period defined by the timer threshold; and
selecting either a performance based shift schedule or an economy based shift schedule based on the throttle position and the output acceleration.

15. The method of executing the acceleration based software of claim 14, wherein the plurality of acceleration thresholds include a first economy acceleration threshold, a second economy acceleration threshold, and a third economy acceleration threshold that correspond with the economy based shift schedule.

16. The method of executing the acceleration based software of claim 14, wherein the plurality of acceleration thresholds include a first performance acceleration threshold, a second performance acceleration threshold, and a third performance acceleration threshold that correspond with the performance based shift schedule.

17. The method of executing the acceleration based software of claim 14, wherein the plurality of throttle position thresholds includes a first throttle position threshold, a second throttle position threshold, and a third throttle position threshold.

18. The method of executing the acceleration based software of claim 17, wherein the first throttle position threshold is used to enable the acceleration based software.

19. The method of executing the acceleration based software of claim 17, wherein the second throttle position threshold and the third throttle position threshold are considered after the acceleration based software is enabled when selecting either the economy shift schedule or the performance shift schedule.

* * * * *